United States Patent [19]
Ogden

[11] Patent Number: 5,873,936
[45] Date of Patent: Feb. 23, 1999

[54] CEMENT COMPOSITION SELF-LEVELING FLOOR COATING FORMULATIONS AND THEIR METHOD OF USE

[75] Inventor: J. Herbert Ogden, Valley Forge, Pa.

[73] Assignee: Maxxon Corp., Hamel, Minn.

[21] Appl. No.: 972,158

[22] Filed: Nov. 17, 1997

[51] Int. Cl.[6] .............................. C04B 7/04; C04B 11/30
[52] U.S. Cl. .................. 106/715; 52/741.1; 106/779; 106/782; 106/783; 106/784; 106/790; 106/816; 427/397.7; 427/403; 427/427; 428/703
[58] Field of Search ..................... 106/715, 779, 106/782, 783, 784, 790, 816; 52/741.1; 427/397.7, 403, 427; 428/703

[56] References Cited

U.S. PATENT DOCUMENTS

| | | | |
|---|---|---|---|
| 2,362,060 | 11/1944 | Etridge et al. | 106/715 |
| 3,582,376 | 6/1971 | Ames | 106/725 |
| 3,852,081 | 12/1974 | Lehman | 106/730 |
| 4,047,961 | 9/1977 | Alderete et al. | 106/715 |
| 4,159,912 | 7/1979 | Jorgenson | 106/735 |
| 4,266,980 | 5/1981 | Chudo et al. | 106/715 |
| 4,293,341 | 10/1981 | Dudley et al. | 106/675 |
| 4,299,516 | 11/1981 | Miyoshi et al. | 106/715 |
| 4,367,986 | 1/1983 | Miyoshi et al. | 106/715 |
| 4,394,175 | 7/1983 | Cheriton et al. | 106/695 |
| 4,443,260 | 4/1984 | Miyoshi et al. | 106/715 |
| 4,657,593 | 4/1987 | Aignesberger et al. | 524/5 |
| 4,747,877 | 5/1988 | Braun | 106/823 |
| 4,818,288 | 4/1989 | Ainesberger et al. | 106/790 |
| 5,273,579 | 12/1993 | Tanaka et al. | 106/715 |
| 5,378,279 | 1/1995 | Conroy | 106/719 |
| 5,403,394 | 4/1995 | Burgand | 106/724 |
| 5,424,099 | 6/1995 | Stewart et al. | 106/695 |
| 5,472,500 | 12/1995 | Janicki | 106/778 |
| 5,558,709 | 9/1996 | Weichmann et al. | 106/727 |
| 5,685,903 | 11/1997 | Stav etal. | 106/715 |
| 5,718,759 | 2/1998 | Stav et al. | 106/715 |

FOREIGN PATENT DOCUMENTS

| | | | |
|---|---|---|---|
| 54-943235 | 4/1979 | Japan | 106/715 |
| 54-099126 | 8/1979 | Japan | 106/715 |
| 56-164047 | 12/1981 | Japan | 106/715 |
| 57-022151 | 2/1982 | Japan | 106/715 |
| 387946 | 6/1973 | U.S.S.R. | 106/715 |
| 1100262 | 6/1984 | U.S.S.R. | 106/715 |
| 2031868 | 4/1980 | United Kingdom | 106/715 |

OTHER PUBLICATIONS

Japio Patent Abstract No. JP406157115A which is an abstract of Japanese Patent Specification No. 06–157115, Jun. 1994.
WPIDS Abstract No. 91–188796 which is an abstract of Japanese Patent Specification No. 03–115147, May 1991.
WPIDS ABstract No. 95–301090 which is an abstract of Russian Federation Patent Specification No. 2029749, Feb. 1995.
Brochure (Item #6092) entitled "Multi–Purpose Self–Leveling Floor Underlayment—Level–Right®PLUS", Maxxon Corporation, Hamel, MN 55340 (May 1997).

*Primary Examiner*—Anthony Green
*Attorney, Agent, or Firm*—Panitch Schwarze Jacobs & Nadel, P.C.

[57] ABSTRACT

A cement composition comprising fine aggregate, preferably sand, in an amount of about 10 to about 25 wt %; blast furnace slag cement, in an amount of about 20 to about 35 wt %; gypsum, in an amount of about 20 to about 35 wt %; Portland cement, in an amount of about 4 to about 30 wt %; and cement plasticizer in an amount of about 0.3 to about 3 wt %. The dry cement composition may be formulated with aggregate and water to prepare a flowable liquid, self-leveling and self-smoothing coating material that may be applied to a substrate such as a floor substrate. The applied coating requires no manual finishing or smoothing, yet hardens to form a level, very smooth coating that possesses excellent compressive strength.

22 Claims, No Drawings

CEMENT COMPOSITION SELF-LEVELING FLOOR COATING FORMULATIONS AND THEIR METHOD OF USE

BACKGROUND OF THE INVENTION

The present invention relates generally to cement compositions and their use and more particularly, to cement compositions useful in self-leveling coating formulations useful for producing floors.

In the construction industry, buildings typically have floors made of concrete. Concrete floors are manufactured from an aqueous mixture of Portland cement and aggregate, e.g., sand, that is applied to a suitable substrate and finished to provide a smooth surface. The aqueous cement-based mixture cures and hardens, forming a concrete floor. The cured concrete floor must be substantially straight and level prior to applying finished flooring such as tile or carpeting.

The aqueous mixtures, containing cement, sand and water, are viscous liquid mixtures that are typically not self-leveling so that laborers must use troweling tools to smooth the surfaces of the mixtures once they have been poured or otherwise applied to the substrate. Troweling tools create rippled surfaces which require additional manual labor for smoothing. The cured concrete floor is typically uneven, although this may not be noticeable to the untrained eye.

In an effort to reduce the cost of labor and the difficulty of leveling poured cement, cementitious materials have been developed having self-leveling characteristics. These coatings are typically applied over an uneven floor substrate as a thin coating which must be applied in a sufficiently thick layer to fill the depressions in the surface of the uneven floor substrate so that the final, level surface is composed solely of the applied coating.

Various compositions useful for providing a poured self-leveling flooring surface have been described in the prior art; see, e.g., U.S. Pat. No. 4,159,912 of Jorgenson, U.S. Pat. No. 4,394,175 of Cheriton et al., U.S. Pat. No. 5,378,279 of Conroy, U.S. Pat. No. 5,403,394 of Burgand and U.S. Pat. No. 5,424,099 of Stewart et al.

There still exists a need for an economical self-leveling coating composition that provides high-quality, very smooth-surfaced cement-based flooring with high compressive strength, excellent durability and freedom from cracking and shrinkage. The present invention provides a cement composition that may be economically shipped long distances from the manufacturing site and formulated at the job site into a free-flowing self-leveling, self-smoothing coating that can be used to prepare high quality cement-based, self-leveling floors.

BRIEF SUMMARY OF THE INVENTION

One aspect of the invention is a cement composition comprising fine aggregate, preferably fine sand, in an amount of about 10 to about 25 wt %; blast furnace slag cement, in an amount of about 20 to about 35 wt %; gypsum, in an amount of about 20 to about 35 wt %; Portland cement, in an amount of about 4 to about 30 wt %; and a cement plasticizer in an amount of about 0.3 to about 3 wt %.

Another aspect of the invention is a coating formulation comprising a flowable homogeneous mixture of the cement composition of this invention, additional aggregate and water, wherein the cement composition and aggregate are present in a weight ratio of about 0.5:1 to about 2:1 and the amount of water is sufficient to provide a flowable, self-leveling formulation.

Still another aspect of the invention is a method of making a floor by pumping the coating formulation of this invention onto a floor substrate to a thickness of not more than about 3 inches, allowing the coating to self-level, and curing the self-leveling cement composition on the substrate, without manual smoothing, to form a level smooth-surfaced dry floor. Yet another aspect of the invention is a hardened floor made by this method, having a compressive strength in excess of about 5000 psi (34M Pa).

DETAILED DESCRIPTION OF THE INVENTION

The cement composition of this invention is a cement-based, powdered or particulate solid that, when blended with an aggregate (such as sand) and water, readily becomes fluidized, i.e., as a liquid mixture, to become a flowable, self-leveling and self-smoothing cementitious coating material. This coating material, hereinafter referred to as a coating formulation, may be applied as a coating over a variety of substrates, including floor substrates, to produce a smooth and level surfaced coating that is free from shrinkage and cracking.

An advantage of the cement composition of this invention is that it contains a relatively small amount of sand, i.e., aggregate, a factor that allows the dry cement composition to be economically shipped from the manufacturing site to end-use sites that are relatively long distances from the manufacturing location. The amount of sand in the dry cement composition represents a relatively small amount of aggregate, as compared to the coarse sand or equivalent aggregate that is subsequently combined with the dry cement composition, along with water, to make a flowable, self-leveling and self-smoothing coating formulation. The fine sand component of the dry cement composition typically represents only about 10 to about 20 wt % of the total aggregate present in a coating formulation prepared from such dry cement composition, with the balance of aggregate being added at the job site, i.e., about 80 to 90 wt % of the required aggregate being blended with the dry cement composition at the job site.

A further advantage of the dry cement composition of this invention is that the aggregate added to the dry cement composition may be any readily available coarse grade of sand, such as mason sand, or an equivalent aggregate. There is no requirement that fine sand, having a relatively fine particle size distribution, be used as the added aggregate in the coating formulation. The discovery that a coarse sand such as mason sand may be used in combination with the dry cement composition of this invention, to prepare a liquid free-flowing, self-leveling and self-smoothing coating formulation, was both unexpected and surprising. This is so since the presence of coarse aggregate in a cement-based flooring composition has previously been associated with detrimental flow characteristics of the coating formulation, precluding the possibility of a self-leveling, self-smoothing floor coating composition. Consequently, the dry cement composition of this invention may be economically shipped to remote job site locations where locally available aggregate is coarse sand or the like. Even at job site locations where a fine grade of sand is available, use of coarse sand is preferred since it is typically a substantially less costly component than fine sand.

The cement composition of this invention comprises fine aggregate, which is preferably fine sand, in an amount of about 10 to about 25 wt %; blast furnace slag cement, in an amount of about 20 to about 35 wt %; gypsum, in an amount of about 20 to about 35 wt %; Portland cement, in an amount of about 4 to about 30 wt %; and a cement plasticizer in an amount of about 0.3 to about 3 wt %.

A preferred embodiment of the cement composition is a dry mixture of particulate solids comprising fine aggregate, which is preferably fine sand, in an amount of about 12 to about 20 wt %; blast furnace slag cement, in an amount of about 25 to about 35 wt %; gypsum, in an amount of about 25 to about 35 wt %; Portland cement, in an amount of about 6 to about 20 wt %; cement gypsum, in an amount of about 5 to about 18 wt %; cement plasticizer, in an amount of about 0.5 to about 3 wt %; vinyl polymer, in an amount of about I to about 4 wt %; and defoamer, in an amount of about 0.1 to about 2 wt %, all percentages being based on the weight of the cement composition.

The cement composition of this invention contains several components, as noted above, and these are now described in more detail.

Aggregate

The aggregate that is a component of the cement composition is preferably sand. The sand or other equivalent aggregate may be generally characterized as a fine grade of aggregate, i.e., in which substantially all of the particles pass through a No. 30 (595 microns) U.S. Standard sieve screen. Preferably, no more than 5 wt % of the fine sand or other equivalent aggregate is retained on a No. 40 (420 microns) U.S. Standard sieve screen, and no more than 15 wt % is retained on a No. 50 (297 microns) U.S. Standard sieve screen. Other types of fine aggregate that are functionally equivalent to fine sand may also be used in the dry cement composition, either in place of fine sand or in combination with fine sand.

The fine sand or other functionally equivalent aggregate should be present in the cement composition of this invention in an amount of about 10 to about 25 wt %, preferably about 12 to about 20 wt % more preferably, about 15 to about 18 wt %, based on the weight of the dry cement composition.

Cement

The cement composition of this invention contains a blast furnace cement component and a Portland cement component, both being used as particulate solids.

The particulate blast furnace slag cement may be any commercially available blast furnace slag cement but is preferably a ground iron blast furnace slag cement. A particularly preferred material is Blue Circle® ground iron blast furnace slag cement in grade 120, available from Blue Circle Cement, Baltimore, Md. The blast furnace slag cement is preferably finely ground, having a particle size distribution in which at least about 90 wt %, and preferably essentially all, of the cement particles pass through a No. 100 (149 microns) U.S. Standard sieve.

The blast furnace slag cement component should be present in the cement composition in an amount of about 20 to about 35 wt %, based on the weight of the dry cement composition. Preferably, the blast furnace slag cement is present in an amount of about 25 to about 35 wt %, and more preferably, about 28 to about 32 wt %, based on the weight of the dry cement composition. The specified weight ranges for the blast furnace slag cement are critical. If amounts below 20 wt % are used in the dry cement composition, the wet mix formed from mixing such a dry cement composition with water and sand exhibits poor flow characteristics. If amounts in excess of 35 wt % are used, the blast furnace slag cement may result in undesirable shrinkage and cracking in a finished floor coating made from such a dry cement composition.

A second cement component in the cement composition of this invention is Portland cement, and the Portland cement used is preferably a Type I Portland cement. Although a Type I cement is preferred, other types of Portland cement, e.g., Type III, may also be used as the Portland cement component in the dry cement composition of this invention. The Portland cement should be present in the dry cement composition in an amount of about 4 to about 30 wt %, preferably about 6 to about 20 wt % and more preferably about 7 to about 15 wt %, all based on the weight of the dry cement composition. The Portland cement should be fine ground and the particle size distribution of the Portland cement should be such that at least about 90 wt %, and preferably essentially all, of the cement particles pass through a No. 100 (149 microns) U.S. Standard sieve.

The presence of the cement components in the dry cement composition is important for providing excellent compressive strength in applied coatings made from a self-leveling and self-smoothing coating formulation containing the dry cement composition of this invention. The presence of the cement components in the cement composition prevents dimensional changes such as shrinkage or expansion of the applied coating during curing and hardening.

Gypsum

The dry cement composition of this invention contains gypsum as a component, and the gypsum is preferably a calcium sulfate α-hemihydrate. The gypsum should be present in an amount of about 20 to about 35 wt %, based on the weight of the dry cement composition. Preferably, the gypsum is present in an amount of about 25 to about 35 wt %, and more preferably about 28 to about 32 wt %, based on the weight of the dry cement composition. The particulate gypsum is preferably finely ground and preferably contains a particle size distribution in which at least about 90 wt %, and preferably essentially all, of the gypsum particles pass through a No. 100 (149 microns) U.S. Standard sieve. A preferred gypsum for use as the gypsum component in the dry cement composition is a white gypsum, such as Hydrocal® white gypsum, available from United States Gypsum Company, Chicago, Ill.

The gypsum and cement components are each essential components in the dry cement composition of this invention. The weight ratio of the gypsum component to the cement component in the dry cement composition is preferably within the range of about 0.8:1 to about 1.2:1 gypsum to cement. More preferably, the weight ratio of gypsum to cement is about 1:1.

The dry cement composition may also contain, in addition to the separate cement and gypsum components, a combination of gypsum and Portland cement, preferably in the form of cement gypsum, as an optional but preferred component. Such cement gypsum may be present in the dry cement composition in an amount of about 1 to about 20 wt %, preferably in an amount of about 5 to about 18 wt % and most preferably in an amount of about 10 to about 16 wt %, all based on the weight of the dry cement composition. Use of cement gypsum will likely reduce the amounts of the separate Portland cement and gypsum components that are desirably present in the cement composition.

Cement gypsum is a combination of Portland cement and gypsum and preferably contains about 50 to about 70 wt % gypsum and about 30 to about 50 wt % Portland cement. Such cement gypsum may optionally contain a dispersing agent, such as a sulfonated condensate of formaldehyde and naphthalene, in an amount of about 0.3 to about 1 wt %, based on the weight of the cement gypsum. Such cement gypsums are described in U.S. Pat. No. 3,852,081 of Lehman, the disclosures of which are hereby incorporated by reference. A preferred cement gypsum for use in the dry cement composition of this invention is Duracal® cement gypsum, available from United States Gypsum Company, Chicago, Ill. Use of the cement gypsum in the dry cement composition of this invention is preferred since this optional component enhances the compressive strength of a hardened coating prepared from such dry cement composition.

Cement Plasticizer

The dry cement composition of this invention includes a cement plasticizer. The cement plasticizer is used in the dry cement composition to impart an excellent fluidity to the flowable, liquid coating formulation made from the dry cement composition. The cement plasticizer serves as a dispersing agent, particularly for the cement and gypsum components, thereby providing the desired fluidizing effect.

The cement plasticizer is employed in the dry cement composition to give homogeneity to the liquid free-flowing, self-leveling coating formulation made from the dry cement composition. The cement plasticizer provides a liquid coating formulation that is a wet mixture, creamy in nature, with stable suspension properties that result in an excellent pumping characteristics which facilitate application and self-leveling of the applied liquid mix on a substrate such as a floor substrate.

Cement plasticizing agents useful in the dry cement composition include melamine sulfonate-formaldehyde condensates, naphthalene sulfonate-formaldehyde condensates, naphthalene sulfonates, calcium lignosulfonates, sodium lignosulfonates, saccharose, sodium gluconate, sulfonic acids, carbohydrates, amino carboxylic acids, polyhydroxy carboxylic acids, sulfonated melamine, and the like.

The amount of cement plasticizer used in the dry cement composition will vary, depending on the fluidizing ability of the particular cement plasticizer selected. Generally, the amount of cement plasticizer is preferably in the range of about 0.3 to about 3 wt %, and more preferably about 0.5 to about 2 wt %, based on the weight of the dry cement composition.

Preferred cement plasticizers include Melment® F-10, a melamine-formaldehyde-sodium bisulfite polymer dispersant, available from SKW Chemicals, Inc., Marietta, Ga., that is a fine white powder. Another suitable plasticizer is Lomar® D, a condensed sodium salt of sulfonated naphthalene formaldehyde, available from Henkel Corp., Ambler, Pa.

Vinyl Polymer

The cement composition optionally may also include a minor proportion of a powdered vinyl polymer or other equivalent polymeric material, to enhance the following properties provided by the cement composition when used in coating formulations: binding or adhesion; resilience and flexural strength; and abrasion resistance. The vinyl polymer or its functional equivalent is preferably a cross-linkable polymer.

The powdered vinyl polymer is preferably polyvinyl acetate or a copolymer of vinyl acetate with another monomer, such as ethylene. A preferred vinyl acetate resin is Airflex® RP-224 thermoplastic resin powder, containing a vinyl acetate-ethylene copolymer, available from Air Products and Chemicals, Inc., Allentown, Pa.

The powdered vinyl polymer is an optional but preferred component in the cement composition, and may be used in amounts of about 0.5 to about 6 wt %, based on the weight of the dry cement composition. Preferably, the vinyl polymer is present in an amount of about 1 to about 4 wt %, and more preferably about 2 wt %, based on the weight of the dry cement composition.

When this optional component is used, it is preferably present in an amount of about 0.5 to about 6 wt %, based on the total weight of the dry cement composition.

Defoamer

The dry cement composition optionally may in addition contain a defoamer, sometimes called a defoaming agent or antifoaming agent. Defoamers for use in cement and concrete products are well known, and such defoamers may be used in the dry cement composition of the present invention.

Cement defoamers include, without limitation, tributyl phosphate, silicones, borate esters, petroleum derivatives (including hydrocarbon emulsions), nonylphenol, polyoxyethylene alkyl phenol, butyl stearate, butyl phthalate, fat alcohols and light alcohols. A preferred defoamer is Foamaster® PD#1 powder, available from Henkel Corporation, Ambler, Pa.; this defoamer is believed to be a petroleum derivative.

The amount of defoamer utilized in the dry cement composition should be enough to prevent air bubble formation during mixing of the dry cement composition with an aggregate (such as sand) and water to produce a liquid flowable, self-leveling and self-smoothing coating formulation. The amount of defoamer should also be sufficient to prevent air bubble formation when the liquid coating formulation is transported (i.e., pumped), poured and laid, since air bubbles that form and rise to the surface may create undesirable cavities ("bug holes") in the surface of the hardened coating. The defoamer may be used in an amount of about 0.1 to about 2 wt %, and more preferably about 0.2 to about 1 wt %, based on the weight of the dry cement composition.

The dry cement composition of this invention is a homogeneous mixture of particulate solids. The dry cement composition preferably has a particle size distribution in which at least about 90 wt % of the particles therein pass through a No. 40 (420 microns) U.S. Standard sieve. A dry cement composition having these particle size characteristics may be prepared by mixing the fine sand, blast furnace slag cement, gypsum, and Portland cement in amounts within the ranges specified above and with particle size distributions as specified above. It is also possible to blend the major components, e.g., cement, gypsum and optionally sand, in the required proportions, but outside of the specified size ranges, and carry out a mixing/milling operation that concurrently mixes and mills the components, to provide a mixture meeting the desired particle size requirements. The remaining components may then be blended into the milled mixture to provide a homogeneous mixture, namely, the dry cement composition of this invention.

The components of the dry cement composition are generally combined in the amounts or proportions described above using convention solids mixing equipment such as a paddle mixer or ribbon-type mixer. The cement and gypsum components are generally high density particulate materials, and these high density components are preferably added after the other components of the dry cement composition have first been mixed with the sand component. Such other components that are mixed with the sand may include the cement plasticizer, vinyl polymer and defoamer. After these components are well mixed with the sand, the gypsum and cement components may be introduced to the mixer and mixing continued to produce a relatively homogeneous solids mixture that is the dry cement composition of this invention.

On a commercial scale, the dry cement composition may be prepared in large batches, e.g., about 1000 to 8000 pounds in size, although these batch sizes are not critical. The resulting dry cement composition may be packaged in bulk or in smaller sizes, e.g., 50-pound or 80-pound bags.

A flowable liquid, self-leveling and self-smoothing coating formulation may be prepared using the dry cement composition of this invention. The dry cement composition is blended with additional aggregate, that is preferably coarse sand (such as mason sand) or the equivalent, and sufficient water to make a free-flowing liquid mixture. The added aggregate that is combined with the dry cement composition is referred to herein as "additional aggregate" to distinguish it from the fine sand or other fine aggregate that is a component of the dry cement composition. As described above, the grade of coarse sand or other equivalent aggregate is not critical. Preferably, the coarse sand or other equivalent aggregate has a particle size distribution that is larger than the fine sand that is a component of the dry cement composition. Preferably, the coarse sand or other equivalent aggregate has a particle size distribution in which at least about 90 wt % of the particles pass through a No. 10 (2.0 mm) U.S. Standard sieve.

The proportion of coarse sand or equivalent aggregate that is blended with the dry cement composition may range from about 0.5 part to about 2 parts by weight aggregate per 1 part by weight of dry cement composition, and is preferably about 0.7 part to about 1.5 parts by weight aggregate per 1 part by weight dry cement composition. A preferred ratio in formulating the flowable coating material is one part by weight aggregate to one part by weight dry cement composition.

The amount of water that is added to the dry cement composition and coarse sand or other aggregate is an amount that provides a liquid mixture that is relatively flowable or free-flowing, and provides the desired self-leveling and self-smoothing characteristics in the coating formulation. The amount of water added may be from about 12 to about 23 wt % based on the total weight of the liquid mixture (including dry cement composition, aggregate and water). An amount of water from about 15 to about 19 wt % based on the total weight of the liquid mixture is more preferred, with about 17 wt % water being most preferred. The two dry components, i.e., dry cement composition and aggregate, may be combined with the water in conventional mixing apparatus, such as that used to prepare commonly-available cement and/or concrete formulations. Conventional equipment for mixing and pumping flowable cement and/or concrete formulations is preferably used for preparing the flowable liquid, self-leveling and self-smoothing coating formulation of this invention. Such equipment typically includes a water tank, a mixing tank for blending the solid components with water, a holding hopper or tank for receiving the liquid mixture, and a pump for transporting the liquid mixture through a hose to the substrate being coated. The hose for transporting the liquid mixture from the pump to the application site is generally of heavy reinforced rubber having an inner diameter of about 1 to about 2 inches, thus being capable of conveying the liquid mixture to the pour site at relatively high flow rates.

The liquid coating formulation of this invention may be pumped, as described above, to the desired application location and applied to a wide variety of different types of substrates. A primary end use application for the coating formulation of this invention is on floor substrates, as a floor coating formulation, but the coating formulation may also be used on other substrates, e.g., for roofing applications. Structural substrates such as plywood, wafer board or concrete are desirably treated with a primer to increase the bond between the substrate and the coating formulation. The substrate may also be treated in advance with a sealer to prevent excessive wicking of water from the aqueous-based coating formulation into the structural substrate before setting of the coating formulation occurs. Such primers and sealers are well known in the floor coating art. If a sealer is used, it is preferable that a primer be applied over the sealer after the sealer has dried, to promote good bonding of the substrate to the applied coating formulation.

Once the flowable liquid, self-leveling and self-smoothing coating formulation has been poured onto a suitable substrate, the coating formulation must be allowed to harden. Initial setting of the applied coating formulation of this invention generally takes about two to about four hours, depending on the thickness of the applied coating. Light foot traffic may be applied after the initial setting has occurred, and heavier traffic after overnight up to about 24 hours from pouring of the coating formulation. When the applied coating formulation has hardened sufficiently to allow heavy traffic, e.g., generally after 24 hours, carpet, linoleum, tile, wood, elastomeric sheet material, or other such well-known coverings for floors or roofs may be laid over the applied coating formulation of this invention. The surface of the hardened coating may optionally be coated with a sealer, but this is not necessary.

The coating formulation of this invention may be applied in a wide range of thicknesses, varying from a feathered edge up to several inches in thickness. A preferred maximum thickness is about 2 to about 3 inches, since this is generally more than sufficient to provide a strong, smooth and level continuous coating over uneven substrates.

The wet mixture made from the dry cement composition of this invention is a pumpable, flowable or free-flowing, self-leveling and self-smoothing coating formulation that exhibits several characteristics that make its use in the construction of floors or the like highly desirable. The formulation is self-leveling and self-smoothing so that once applied to a horizontal substrate, the material self-levels under the influence of gravity to produce a highly smooth and level upper surface, without any need for manual finishing or smoothing. Pouring and application of the liquid mix to prepare a finished floor coating is very fast with the self-leveling and self-smoothing coating formulation of this invention; for example, an area of 1800 square feet may be finished in about 2 hours. This is so because flowability of the liquid mix is excellent. Laboratory testing of the flowability of the liquid mix, using a 65 $cm^3$ sample containing 200 grams (g) of dry cement composition and 200 g of sand with 17% by weight water in the total coating formulation mix, will completely self-level on a horizontal, unrestrained surface to produce a smooth surfaced circular area of coating having a diameter of about 7 inches (18 cm)±10%.

Working time for the liquid mix, also called "the open time", during which the liquid mix may be worked, yet will still self-level and self-smooth, is about 17 to about 25 minutes, depending on the temperature and humidity in the application environment.

The coating formulation also has a relatively quick setting time, with initial set being about two to about four hours, after which light walking or foot traffic is possible. The applied coating of this invention is substantially completely hardened overnight, after which heavy foot traffic is possible. Compressive strength of the hardened coating formulation is excellent, generally being in excess of 5000 psi (34 MPa), as measured by ASTM Standard C-109. Compressive strengths of 7000 psi (48 MPa) or more are also possible, particularly with use of the dry cement composition described in Example 1.

The resulting hardened coating made from the dry cement composition of this invention is noteworthy for its lack of dimensional change, particularly shrinkage, and freedom from crack formation. These characteristics reduce the likelihood that the applied coating may delaminate or be ineffectively bonded to the substrate after the coating has cured and hardened. The hardened finished coating is also noteworthy as being free of surface dusting and providing a very smooth uniform and level upper surface. The hardened coating also exhibits excellent resistance to damage from freeze-thaw cycles.

The combination of these characteristics, including the excellent compressive strength of the resulting hardened coating, makes the floors produced from the dry cement composition of this invention highly useful and desirable in a variety of end use applications. The resulting hardened floor coating may be used as a subfloor, for the application of finished flooring materials such as tile, carpet, wooden flooring or the like, or may be used as a finished floor, for its desirable properties of being completely level and smooth, e.g., as the finished floor in a commercial photography studio or television studio.

The invention is further illustrated by the following non-limiting Examples.

EXAMPLE 1

This Example 1 describes the preparation of a dry cement composition of the present invention. The cement composition is prepared as a dry powdered solid that has a relatively fine particle size, in which at least about 95% by weight passes through a No. 40 (420 microns) U.S. Standard sieve. The components used to prepare the cement composition and their relative amounts by weight, based on the weight of the dry cement composition, are described in Table 1 below.

The primary cement components were iron blast furnace slag cement, in an amount of 29.7 wt %, and Type I Portland cement, in an amount of 8.1%. The gypsum component was present as Hydrocal® white gypsum (available from United States Gypsum Company) in an amount of 29.0 wt %. Additional Portland cement and gypsum were present in the form of Duracal® cement gypsum (available from U.S. Gypsum Company), in an amount of 12.9 wt %. Duracal® cement gypsum is a proprietary blend containing Portland cement and gypsum. Fine sand, having a particle size distribution as noted in Table 1, was present in an amount of 16.8 wt %. In the particle size distribution data noted in Table 1, "+" indicates material retained on a sieve of the designated size, e.g., "+30" refers to material retained on a No. 30 U.S. Standard sieve; and "−" indicates material passing through a sieve of a designated size, e.g., "−200" refers to material that passing through a No. 200 U.S. Standard sieve. A designation such as "−30 +40" refers to the fraction of material that passed though a No. 30 sieve but that was retained on a No. 40 sieve, it being understood that higher sieve numbers indicate screens with finer mesh openings.

The remaining components in the cement composition included a cement plasticizer, Melment® F10 melamine-formaldehyde-sodium bisulfite anionic polymer (available from SKW Chemicals, Inc.), that was present in an amount of 1.1 wt %. A vinyl acetate-ethylene copolymer, Airflex® RP-224 thermoplastic resin (available from Air Products and Chemicals, Inc.), was present in an amount of 1.9 wt %. A defoamer, Foamaster® PD#1 (available from Henkel Corporation), was present in an amount of 0.5 wt %. These last three components were in the form of powdered solids.

The last three components, cement plasticizer, vinyl acetate-ethylene copolymer and defoamer, were added to the fine sand and were blended in a Gemco mixer for about 20 minutes to produce a relatively homogeneous mixture of these solid components. This mixture was then blended with the remaining components, i.e., the cement and gypsum and cement gypsum, in the paddle mixer and mixed for about 20 minutes to produce a cement composition in the form of a dry powdered solid in which the components were relatively homogeneously distributed throughout the mixture. This mixture was then packaged in 50-pound paper bags. The dry cement composition may be used as described in Example 2.

TABLE 1

Cement Composition (Powdered Solid)

| Component | Amount (wt %) |
|---|---|
| Blast Furnace Slag Cement<br>(Blue Circle Cement, Baltimore, MD) | 29.7 |
| Gypsum<br>Hydrocal ® White Gypsum<br>(United States Gypsum Co., Chicago, IL) | 29.0 |
| Fine Sand | 16.8 |

| U.S. Standard Sieve | wt % |
|---|---|
| +30 | 0 |
| −30 + 40 | 1.8 |
| −40 + 50 | 9.9 |
| −50 + 70 | 27.7 |
| −70 + 100 | 33.6 |
| −100 + 140 | 18.8 |
| −140 + 200 | 6.9 |
| −200 | 1.3 |

| Component | Amount (wt %) |
|---|---|
| Gypsum Cement<br>Duracel ® Cement<br>(United States Gypsum Co., Chicago, IL) | 12.9 |
| Portland Cement (Type I)<br>(Lehigh Portland Cement Co., Allentown, PA) | 8.1 |
| Cement plasticizer (powdered solid)<br>Melment ® F10 melamine-formaldehyde-sodium<br>bisulfite anionic polymer<br>(SKW Chemicals, Inc., Marietta, GA) | 1.1 |
| Vinyl Acetate-Ethylene Copolymer (powdered solid)<br>Airflex ® RP-224 thermoplastic resin<br>(Air Products and Chemicals, Inc., Allentown, PA) | 1.9 |
| Defoamer (powdered soldi)<br>Foamaster ® PD#1<br>(Henkel Corp., Ambler, PA) | 0.5 |
|  | 100% |

EXAMPLE 2

This Example 2 describes the preparation of a free-flowing, self-leveling floor coating formulation and its application to a floor substrate to provide a fast setting smooth, level floor. This formulation is prepared by mixing the dry cement composition made according to Example 1 with mason sand (a commonly available coarse grade of sand) and water, in the relative amounts as shown in Table 2 below. One hundred parts by weight of the dry cement composition of Example 1 is blended with 100 parts by weight of mason sand and sufficient water to provide 17% by weight water in the resulting formulation, based on the total weight of the formulation. The weight ratio of mason sand, i.e., the added aggregate, to fine sand in the dry cement composition is about 7:1, and this ratio confirms that only a small proportion of the total aggregate, namely about 15%, of the floor coating formulation is originally present in the dry cement composition.

The formulation is prepared in a Moyno® mixer/pump, available from Robbins-Myers, Inc., Springfield, Ohio, to form a relatively free-flowing, self-leveling liquid mixture. The free-flowing, self-leveling formulation is applied by pumping through a hose to an uneven substrate in a single pour to a depth that averages about 1.5 inches (38 mm). The poured floor coating is self-leveling and self-smoothing; it requires no troweling, yet produces a finished hardened surface that is both smooth and level. The poured floor has an initial set time of about 2 to 4 hours, and has a fully dried set time of about 24 hours. After the initial set, the flooring is suitable for light foot traffic. The resulting floor has a dry density of about 120 to 125 lbs per cubic foot and a compressive strength in excess of 5000 psi (34 MPa), as measured by ASTM C-109 after 7 days.

TABLE 2

| Formulation Ingredients | | Amount (parts by weight) |
|---|---|---|
| Dry Cement Composition (Example 1) | | 100 |
| Coarse Sand (mason sand) | | 100 |
| U.S. Standard Sieve | Wt % | |
| +4 | 0 | |
| −4 + 8 | 1.2 | |
| −8 + 16 | 5.6 | |
| −16 + 30 | 30.2 | |
| −30 + 50 | 38.7 | |
| −50 + 100 | 22.7 | |
| −100 + 200 | 1.6 | |
| −200 | 0 | |
| Water | | 41 |

The preceding specific embodiments are illustrative of the practice of this invention. The present invention may be embodied in other specific forms without departing from the spirit or essential attributes thereof and, accordingly, reference is made to the appended claims, rather than the foregoing specification, as indicating the scope of the invention.

What is claimed is:

1. A cement composition comprising:
   (a) fine aggregate, in an amount of about 10 to about 25 wt %;
   (b) blast furnace slag cement, in an amount of about 20 to about 35 wt %;
   (c) gypsum, in an amount of about 20 to about 35 wt %;
   (d) Portland cement, in an amount of about 4 to about 30 wt %; and
   (e) a cement plasticizer in an amount of about 0.3 to about 3 wt %.

2. The composition of claim 1 wherein the cement and gypsum components are present in a weight ratio of about 0.8:1 to about 1.2:1.

3. The composition of claim 1 wherein the fine aggregate is fine sand.

4. The composition of claim 1 wherein the Portland cement is Type I Portland cement.

5. The composition of claim 1 wherein the cement plasticizer is selected from the group consisting of a melamine sulfonate-formaldehyde condensate, a naphthalene sulfonate-formaldehyde condensate, a naphthalene sulfonate, a calcium lignosulfonate, a sodium lignosulfonate, a saccharose, a sodium gluconate, a sulfonic acid, a carbohydrate, an amino carboxylic acid, a polyhydroxy carboxylic acid, and a sulfonated melamine.

6. The composition of claim 1 which further comprises a vinyl polymer, in an amount of about 0.5 to about 6 wt %, based on the weight of the composition.

7. The composition of claim 6 wherein the vinyl polymer is a copolymer of vinyl acetate and ethylene.

8. The composition of claim 1 which further comprises a defoamer, in an amount of about 0.1 to about 2 wt %, based on the weight of the composition.

9. The composition of claim 8 wherein the defoamer is selected from the group consisting of a tributyl phosphate, a silicone, a borate ester, a petroleum derivative, a polyoxyethylene alkyl phenol, a nonylphenol, a butyl stearate, a butyl phthalate, a fat alcohol and a light alcohol.

10. The composition of claim 1 which further comprises cement gypsum in an amount of about 1 to about 20 wt %.

11. The composition of claim 10 wherein the cement gypsum contains about 50 to about 70 wt % gypsum and about 30 to about 50 wt % of Portland cement.

12. The composition of claim 1 wherein the composition has a particle size distribution in which at least about 90 wt % of the particles pass through a No. 40 (420 microns) U.S. Standard sieve.

13. The composition of claim 1 wherein the cement and gypsum components have a particle size distribution in which at least about 90 wt % of the particles pass through a No. 100 (149 microns) U.S. Standard sieve.

14. A cement composition comprising a mixture of particulate solids comprising (a) fine aggregate, in an amount of about 12 to about 20 wt %;
   (b) blast furnace slag cement, in an amount of about 25 to about 35 wt %;
   (c) gypsum, in an amount of about 25 to about 35 wt %;
   (d) Portland cement, in an amount of about 6 to about 20 wt %;
   (e) cement gypsum, in an amount of about 5 to about 18 wt %;
   (f) cement plasticizer, in an amount of about 0.5 to about 3 wt %;
   (g) vinyl polymer, in an amount of about 1 to about 4 wt %; and
   (h) defoamer, in an amount of about 0.1 to about 2 wt %, all percentages being based on the weight of the cement composition.

15. The cement composition of claim 14 wherein the fine aggregate is fine sand.

16. A coating formulation comprising a flowable homogeneous mixture of (a) a cement composition, (b) additional aggregate and (c) water, wherein the cement composition and the additional aggregate are present in a weight ratio of about 0.5:1 to about 2:1 and the amount of water is sufficient to provide a flowable, self-leveling formulation, the cement composition comprising
   (i) fine aggregate, in an amount of about 10 to about 25 wt %;
   (ii) blast furnace slag cement, in an amount of about 20 to about 35 wt %;
   (iii) gypsum, in an amount of about 20 to about 35 wt %;
   (iv) Portland cement, in an amount of about 4 to about 30 wt %; and
   (v) a cement plasticizer in an amount of about 0.3 to about 3 wt %.

17. The coating formulation of claim 16 wherein the water is present in an amount of about 12 wt % to about 23 wt %, based on the weight of the formulation.

18. The coating formulation of claim 16 wherein the additional aggregate has a median particle size that is larger than that of the fine aggregate.

19. The coating formulation of claim 16 wherein the additional aggregate has a particle size distribution in which at least about 90 wt % of the particles pass through a No. 10 (2.0 mm) U.S. Standard sieve.

20. The coating formulation of claim 16 wherein the additional aggregate is coarse sand.

21. A method of making a floor by pumping the floor coating formulation of claim 16 onto a floor substrate to a thickness of not more than about 3 inches to form a floor coating, allowing the floor coating to self-level, and curing the self-leveling floor coating formulation on the substrate, without manual smoothing, to form a level smooth-surfaced dry floor.

22. A hardened floor made by the method of claim 21, having a compressive strength in excess of about 5000 psi (34 M Pa).

* * * * *